United States Patent
Young et al.

(10) Patent No.: US 8,049,715 B2
(45) Date of Patent: Nov. 1, 2011

(54) METHOD AND SYSTEM FOR ACCESSING DATA STORED IN AN ELECTRONIC DEVICE

(75) Inventors: Hoi L. Young, Lake Villa, IL (US); Michael Bohan, Fox Lake, IL (US); Timothy A. Bruns, Racine, WI (US); Peter J. Ina, Arlington Heights, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1124 days.

(21) Appl. No.: 11/290,106

(22) Filed: Nov. 30, 2005

(65) Prior Publication Data

US 2007/0120819 A1   May 31, 2007

(51) Int. Cl.
 *G09G 5/00*   (2006.01)
(52) U.S. Cl. .................. 345/156; 345/169; 345/173
(58) Field of Classification Search .......... 345/156–173; 707/3, 102; 715/810, 818, 854–855
 See application file for complete search history.

(56) References Cited

U.S. PATENT DOCUMENTS

| | | | | |
|---|---|---|---|---|
| 5,734,928 A | * | 3/1998 | Nakasuji | 710/67 |
| 6,278,384 B1 | * | 8/2001 | Ide | 341/26 |
| 6,741,232 B1 | | 5/2004 | Siedlikowski et al. | |
| 6,992,658 B2 | * | 1/2006 | Wu et al. | 345/169 |
| 7,312,785 B2 | * | 12/2007 | Tsuk et al. | 345/156 |
| 7,683,918 B2 | * | 3/2010 | Bohan et al. | 345/684 |
| 7,712,053 B2 | * | 5/2010 | Bradford et al. | 715/864 |
| 2002/0109707 A1 | | 8/2002 | Lao et al. | |
| 2004/0222965 A1 | | 11/2004 | Riccomini et al. | |
| 2005/0052425 A1 | * | 3/2005 | Zadesky et al. | 345/173 |

FOREIGN PATENT DOCUMENTS

| EP | 1473621 B1 | 8/2006 |
|---|---|---|
| GB | 2355143 A | 10/1999 |

* cited by examiner

*Primary Examiner* — Alexander S Beck
*Assistant Examiner* — Mansour M Said
(74) *Attorney, Agent, or Firm* — Gary J. Cunningham

(57) ABSTRACT

A method and a system for accessing data stored in an electronic device (102) are disclosed. The data is stored in a data structure. The data structure includes a plurality of sets. Each of the plurality of sets includes at least one entry with an identical first character. The method includes varying (302) the speed of navigation through the data structure by using the input device (204). The method also includes displaying (304) a pre-defined entry from each of the plurality of sets, based on a pre-defined actuation of the input device.

9 Claims, 6 Drawing Sheets

METHOD AND SYSTEM FOR ACCESSING DATA STORED IN AN ELECTRONIC DEVICE

FIELD

The present disclosure relates in general to an electronic device, and more specifically, to a method and a system for accessing data stored in an electronic device.

BACKGROUND

An electronic device may contain data to be used in various applications. The data is stored in a data structure as entries. A data structure is a logical relationship among different entries of data. Examples of the data structure include a list, an array, a stack, a queue, and the like. Accessing a specific entry from a data structure can be difficult and time consuming when the data structure contains a large number of entries. In the worst case, if the number of entries in the data structure is too large the user may not be able to access data stored in the data structure, or it may take very long to access a specific entry due to large quantity of data.

Various methods exist for simplifying the process of scrolling through the data structure stored in an electronic device. One such method involves sequentially scrolling through all the entries stored in the data structure. In another method, the speed of scrolling through the data structure is varied based on the manner in which an input is provided through an input device, such as a joystick, associated with the electronic device.

Unfortunately, the above methods only access the data structure sequentially by scrolling through all the entries. This is a time consuming and tiresome process, if the number of entries in the data structure is large. Further, the use of a joystick or the like does not reduce the time taken to access the data structure.

SUMMARY

The present disclosure describes a method and a system for accessing data stored in an electronic device. The data is stored in a data structure. The method includes varying the speed of navigation through the data structure by using an input device. Further, a pre-defined entry from each of a plurality of sets is displayed, based on a pre-defined actuation of the input device.

BRIEF DESCRIPTION OF THE FIGURES

The present disclosure is illustrated by way of example, and not limitation, in the accompanying figures, in which like references indicate similar elements, and in which.

Figure 1:
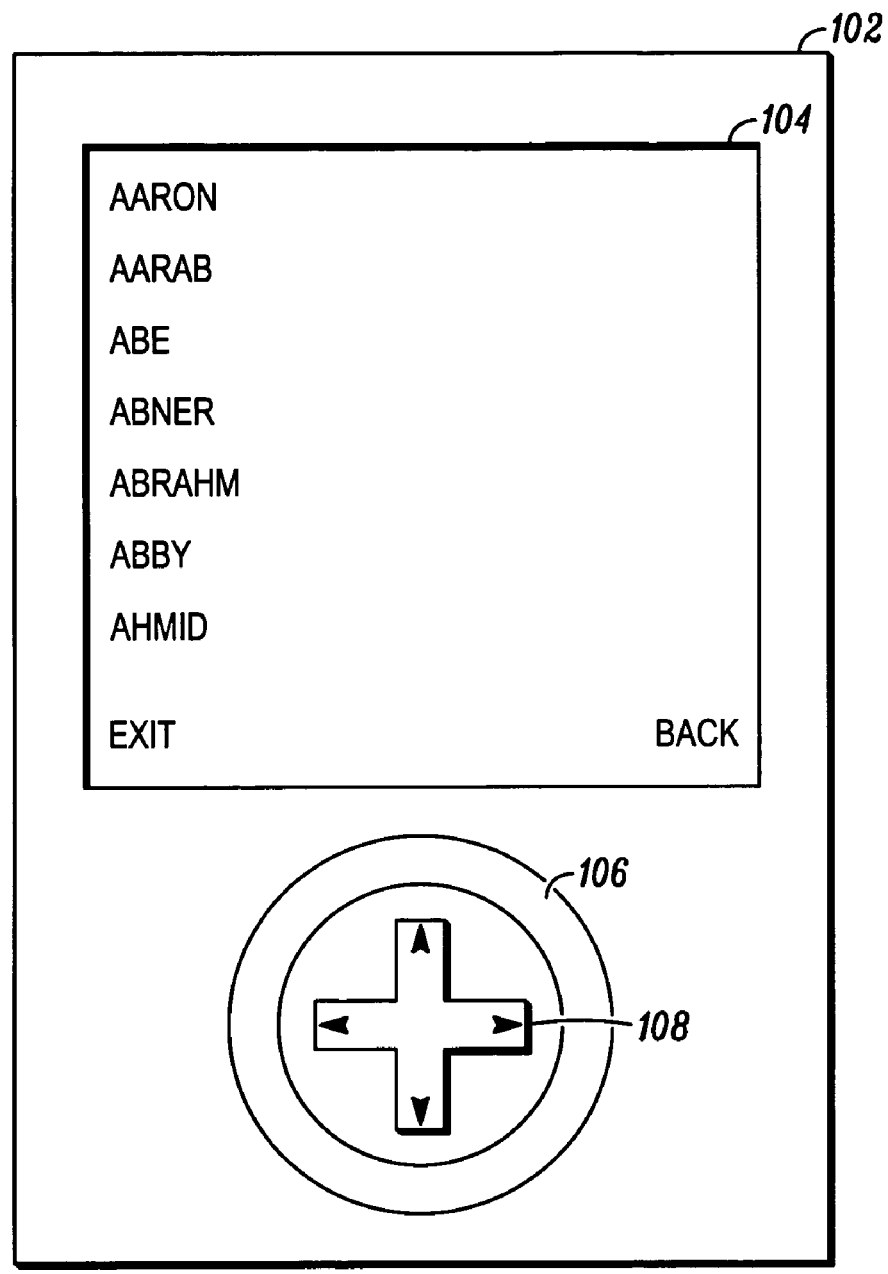
FIG. 1 represents an exemplary electronic device, in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve an understanding of embodiments of the present disclosure.

DETAILED DESCRIPTION

Before describing in detail the particular method and system for accessing data stored in an electronic device, in accordance with an embodiment of the present disclosure, it should be observed that the present disclosure resides primarily in combinations of method steps and apparatus components related to the method and system for accessing data stored in an electronic device. Accordingly, the apparatus components and method steps have been represented where appropriate by conventional symbols in the drawings, showing only those specific details that are pertinent to understanding the present disclosure, so as not to obscure the disclosure with details that will be readily apparent to those of ordinary skill in the art, having the benefit of the description herein.

Throughout this application, the terms "variable speed input device" and "rotating type input device" are used for the sake of clarity only; however it will be apparent to a person ordinarily skilled in the art that the invention can be implemented with reference to any input device associated with the electronic device.

FIG. 1 represents an exemplary electronic device 102, in accordance with an embodiment. The electronic device 102 includes a screen 104, a variable speed input device 106 and a four-way navigation key 108. The variable speed input device 106 may be a rotating type input device, a jog wheel, a track ball, a pressure sensitive input device, a joystick or any other input device capable of signaling a desired variation in speed. The electronic device 102 is capable of storing data in various formats. In accordance with an embodiment, data may be stored in the form of data structures. The data structure stores data in a plurality of sets, such that each set includes a plurality of entries. In accordance with an embodiment, the plurality of entries associated with each set can begin with an identical first character. For example, a set may contain entries beginning with the alphabet 'A'. Another set may contain entries beginning with the alphabet 'B'. Other characters can also be used such as numeric, symbolic or any other characters. The plurality of entries is displayed on the screen 104. Examples of the type of the screen 104 can be a Liquid Crystal Display (LCD) screen, a plasma screen, a Light-Emitting Diode (LED) screen, or any other display device. The variable speed input device 106 or the four-way navigation key 108 can be used for scrolling through the plurality of entries displayed on the screen 104.

Figure 2:
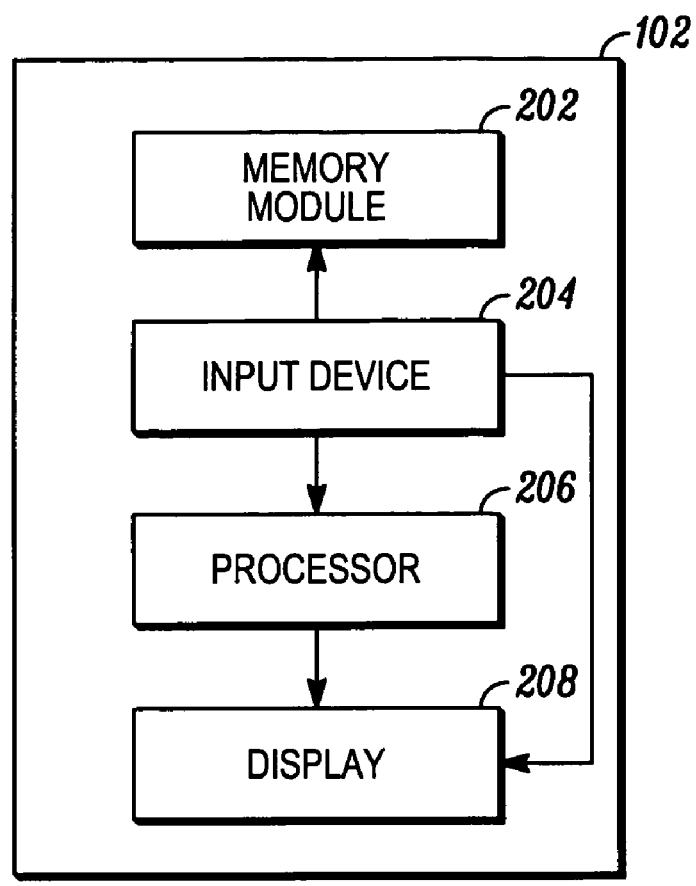
FIG. 2 is a block diagram of an electronic device, in accordance with an embodiment.

FIG. 2 is a block diagram of the electronic device 102, in accordance with an embodiment. The electronic device 102 can include a memory module 202, an input device 204, and a processor 206. The memory module 202 is configured to store data. The data is stored in a data structure. The data structure includes data classified in a plurality of sets. The input device 204 enables navigation through the data structure. The input device 204 is configured to vary the speed of navigation through the data structure. The input device 204 can be same as the variable speed input device 106. Thus, examples of the input device 204 can include, but are not limited to, a coin key, a capacitive-type scroller, a resistivetype scroller, a keypad, a four-way navigation key, and a joystick. Based on the speed of navigation, the processor 206 selects a pre-defined entry from each set of the plurality of sets. In accordance with an embodiment, the pre-defined entry can be a first entry associated with each set of the plurality of sets, also known as the first pre-defined entry. The first pre-defined entry is explained in detail in conjunction with FIG. 5. In accordance with another embodiment, the pre-defined entry can be a last entry associated with each of the plurality of sets. In accordance with yet another embodiment, the pre-defined entry can be the most frequently accessed entry associated with each of the plurality of sets. Further, the electronic device 102 also includes a display 208. The pre-defined entry selected by the processor 206 can be displayed and highlighted by the display 208. The display of the pre-defined entry begins at the top of the display 208.

Figure 3:
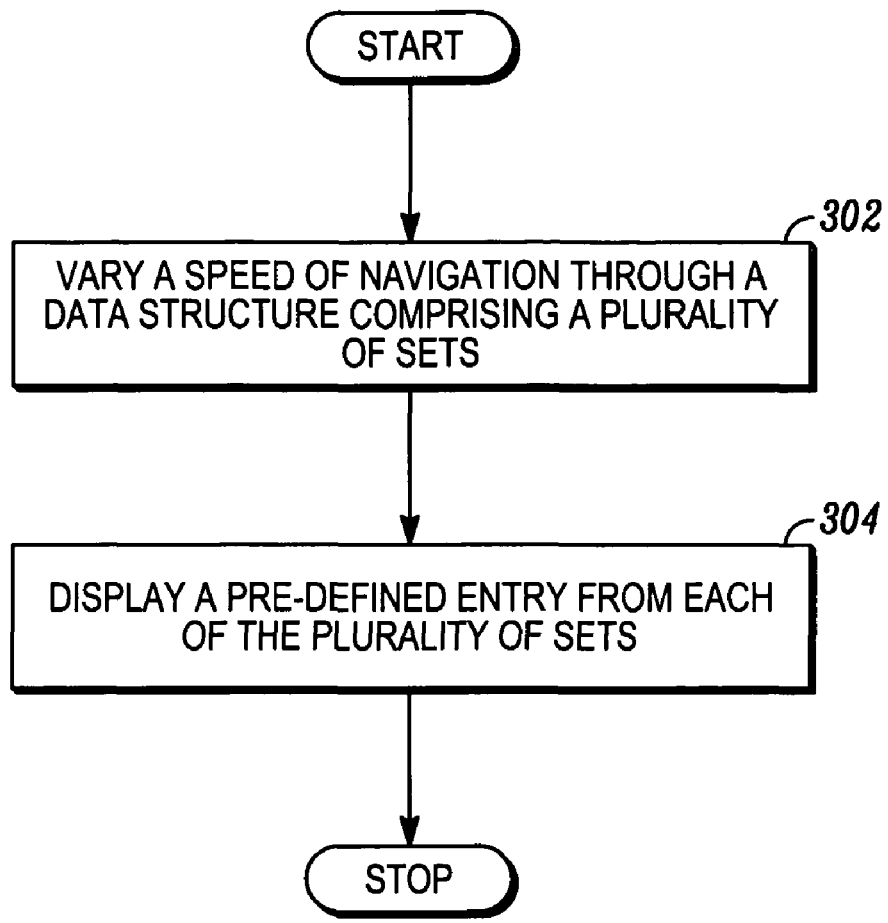
FIG. 3 is a flowchart illustrating a method for accessing data stored in an electronic device, in accordance with an embodiment.

FIG. 3 is a flowchart illustrating a method for accessing data stored in an electronic device 102, in accordance with an embodiment. At step 302, the speed of navigation through a data structure that stores the data is varied by using the input device 204. In accordance with an embodiment, the input device 204 is a variable speed input device. In accordance with another embodiment, the input device 204 can be a four-way navigation key to navigate through the data structure. The data structure is stored in the memory module 202 and stores data in the form of sets, with each set including at least one entry. In an embodiment, all the entries in a set can begin with an identical first character or as otherwise described above. Thereafter, at step 304, a pre-defined entry from each of the sets is displayed. The pre-defined entry is displayed by the display 208. The display of the pre-defined entries begins at the top of the display 208. In an embodiment, the speed of navigation through the data structure can be varied by pressing a key of the input device 204. The pre-defined entry from each of the sets is displayed, based on a pre-defined actuation. In an embodiment, the pre-defined actuation is a threshold period of pressing a key or otherwise actuating an input device. When the key is pressed for at least the threshold period for navigating through the data structure, the pre-defined entry is selected from each of the sets for display. In another embodiment, the pre-defined actuation is a threshold speed of rotation. When the speed of rotation of a rotating type input device increases above the threshold speed, a pre-defined entry from each set of the plurality of sets is displayed. The processor 206 selects the pre-defined entry. Thereafter, the pre-defined entry selected by the processor 206, is displayed at the top of the display 208. Alternatively, when the key is pressed for a period that is less than the threshold period, or when the rotating type input device is rotated at a speed that is less than the threshold speed, at least one or more entry of all the entries associated with each of the sets is selected for display. This entry is selected by the processor 206. Thereafter, this entry is displayed by the display 208. In other words, the display 208 can display each entry in the data structure or at least as many as can fit on the display 208.

Figure 4:
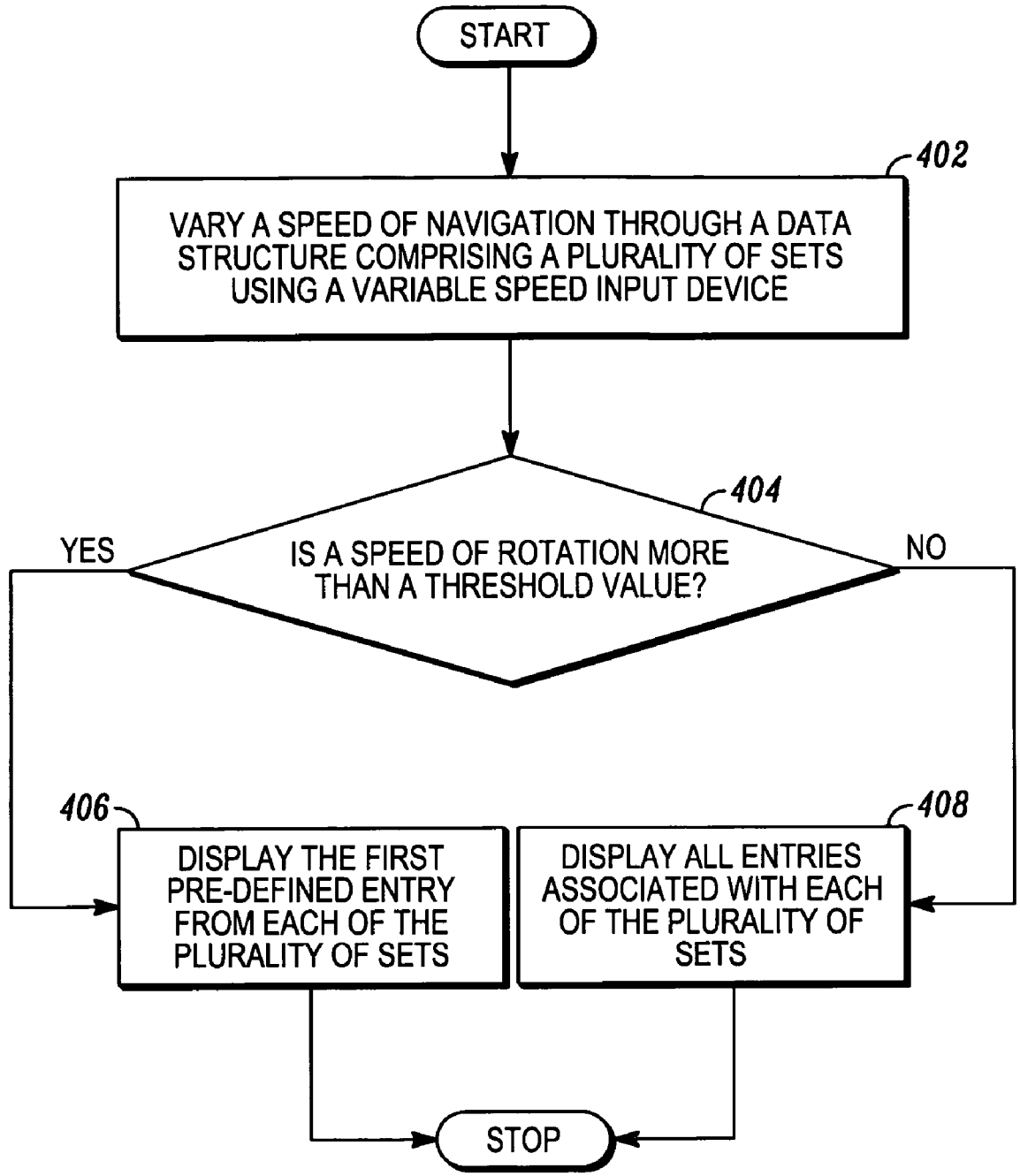
FIG. 4 is a flowchart illustrating a method for accessing data stored in an electronic device, in accordance with another embodiment.

FIG. 4 is a flowchart illustrating another method for accessing data stored in an electronic device 102 by using a variable speed input device, in accordance with another embodiment. At step 402, the speed of navigation through a data structure that stores the data is varied. The data structure includes a plurality of sets. The speed of navigation through the data structure can be varied by changing the speed of rotation of the variable speed input device. In an embodiment, the variable speed input device can be rotated in a clockwise direction, to scroll through the data structure in a first direction. To scroll in a second direction, the variable speed input device can be rotated in an anti-clockwise direction. At step 404, a check is performed to verify whether a speed of rotation of the variable speed input device is more than a threshold speed. If the speed of rotation is more than the threshold speed, then a pre-defined entry from each of the plurality of sets is displayed beginning at the top of the display 208 at step 406. Alternatively, each entry associated with each set of the plurality of sets is displayed at step 408. In an embodiment, the processor 206 can be configured to convert the rotational motion of the rotating type input device into a translational motion through the data structure. In another embodiment, the processor 206 is configured to convert a key press into a translational motion through the data structure.

Figure 5:
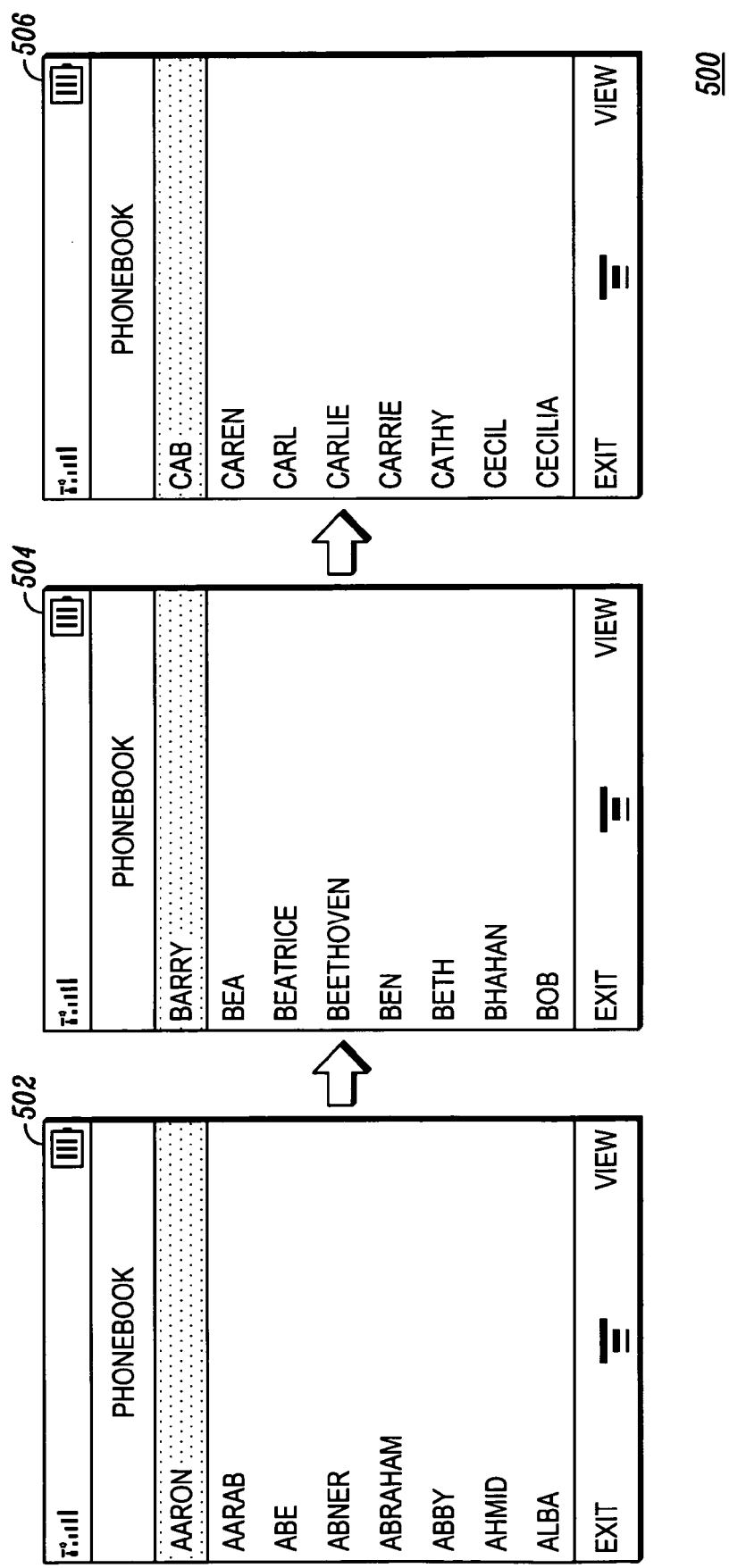
FIG. 5 represents a set of subsequent representations of a phone-book while scrolling, in accordance with an embodiment.

FIG. 5 represents a set of subsequent representations 500 while scrolling through a phone book stored in an electronic device 102, in accordance with an embodiment. The set of subsequent representations 500 of the phone book includes a first representation 502, a second representation 504, and a third representation 506. A phone book is an exemplary type of data structure, which stores a list of entries in the electronic device 102. The entries are arranged in an alphabetical order. All the entries with an identical first character represent a set. Consider a first set that includes all the entries in the phone book that start with the alphabet 'A', as represented in the first representation 502. A second set and a third set includes all the entries in the phone book that start with the letter 'B' and letter 'C', respectively.

In an embodiment, when a variable speed input device for navigating through the phone book can be rotated in an anti-clockwise direction, scrolling through the entries of the phone book is in upwards. To scroll downwards in the phone book, the variable speed input device can be rotated in a clockwise direction. Consider a case in which the speed of rotation of the variable speed input device is at least equal to the threshold speed of rotation. In this case, scrolling through the phone book starts from the first entry 'Aaron' of the first set, as shown in the first representation 502. Scrolling continues from the first entry of the first set to the first entry of the second set 'Barry', as shown in the second representation 504. Further, as shown in the third representation 506, scrolling continues to the first entry of the third set 'Cab'. Thus, when the speed of rotation of the variable speed input device is at least equal to the threshold speed the scrolling takes place through the first pre-defined entry of each set. The first pre-defined entry of each set may always be displayed beginning at the top of the display 208. Also, if scrolling backward through the entries, a relative pre-defined entry may be displayed at the bottom of the display 208. Additionally, the pre-defined entry may be displayed at the middle or anywhere else useful of the display 208 depending on the function being performed, pre-defined settings, user settings, or for any other useful purpose.

In another embodiment, the speed of navigation through the phone book can be varied by using a four-way navigation key. To scroll upwards through the phone book, a first portion of the four-way navigation key is pressed. Similarly to scroll downwards, a second portion of the four-way navigation key is pressed. Consider the case of scrolling through the phone book so that the first portion is pressed for a period that is greater than the threshold period. In this case, scrolling is carried out through the first entries of each of the sets in the phone book. This scrolling is identical to the method of scrolling described in conjunction with FIG. 5 above.

Figure 6:
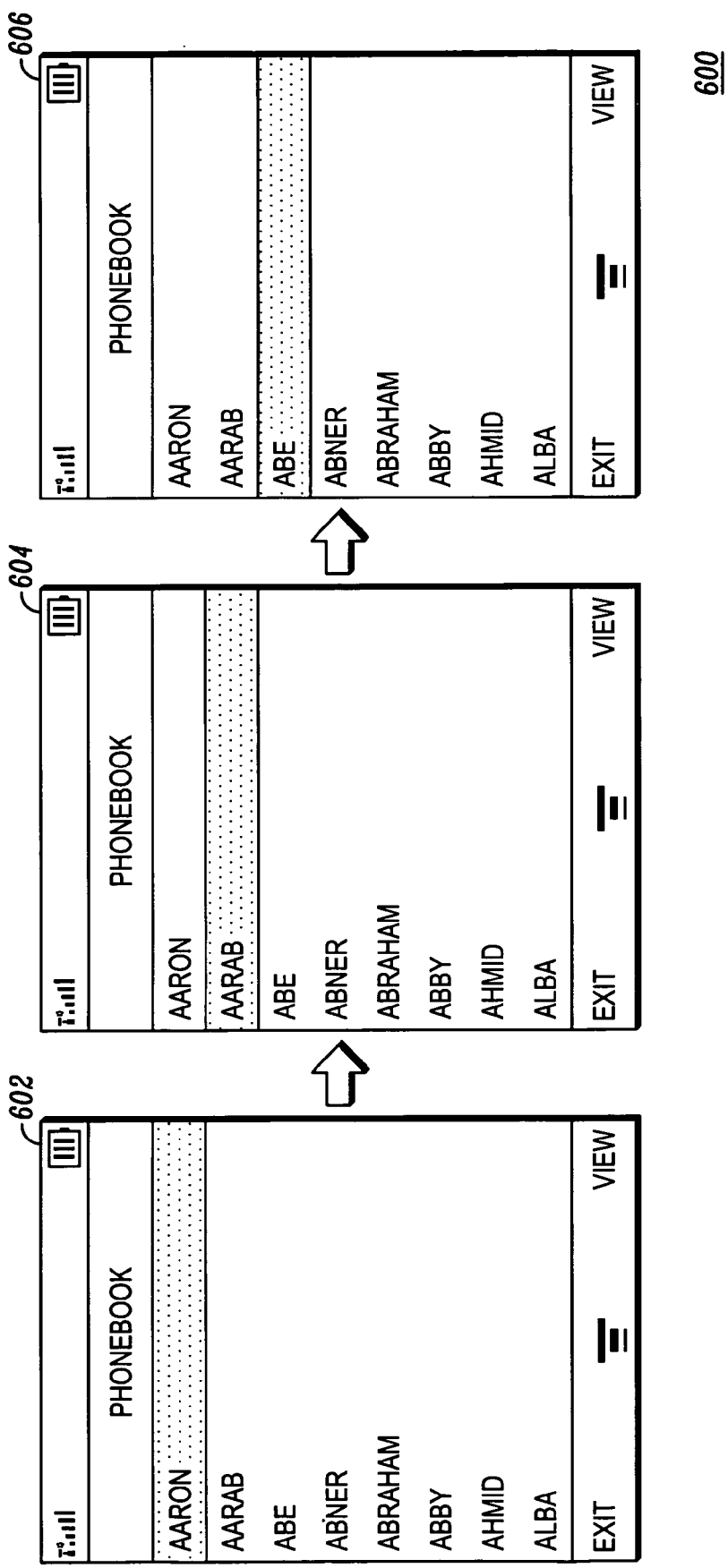
FIG. 6 represents another set of subsequent representations of the phone book while scrolling, in accordance with an embodiment.

FIG. 6 represents another set of subsequent representations 600, while scrolling through the phone book stored in an electronic device 102, in accordance with another embodiment. The set of subsequent representations 600 includes a representation 602, a representation 604, and a representation 606. Consider a case of scrolling when the speed of rotation of the variable speed input device is less the threshold speed. The scrolling starts from the first entry of the first set 'Aaron', as shown in the representation 602. The next displayed entry is the second entry of the first set, 'Aarab', as shown in the representation 604. Thereafter, the next displayed entry is the third entry of the first set, 'Abe', as shown in the representation 606. The scrolling continues through each entry in the phone book.

In another embodiment, the speed of navigation through the phone book can be varied by using a four-way navigation key. To scroll through all the entries in the phone book, a first portion of the four-way navigation key is pressed for a period that is less than the threshold period. The method for scrolling through each entry in the phone book is identical to the method of scrolling described above.

Various embodiments of the present disclosure provide a method and a system for accessing data stored in a data structure quickly. This saves a considerable amount of time when the data structure includes a large number of entries. Further, the method provides different ways to access the data structure, based on the speed of scrolling.

In this document, relational terms such as first and second, and the like may be used solely to distinguish one entity or action from another entity or action without necessarily requiring or implying any actual such relationship or order between such entities or actions. The terms "comprises," "comprising", "includes", "including", or any other variation thereof, are intended to cover a non-exclusive inclusion, such that a process, method, article, system or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, system, or apparatus that comprises the element.

It will be appreciated that the modules described herein may be comprised of one or more conventional processors and unique stored program instructions that control the one or more processors to implement, in conjunction with certain non-processor circuits, some, most, or all of the functions of the modules described herein. The non-processor circuits may include, but are not limited to, a radio receiver, a radio transmitter, signal drivers, clock circuits, power source circuits, and user input devices. As such, these functions may be interpreted as steps of method for accessing a data structure stored in an electronic device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein.

In the foregoing specification, the disclosure and its benefits and advantages have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A method for accessing data stored in an electronic device, the data being stored in a data structure, the data structure comprising a plurality of sets, each of the plurality of sets comprising at least one entry, each of the at least one entry having an identical first character as another entry in its respective set if another entry exists in the respective set, the method comprising:
   providing a variable speed input device to navigate through a data structure;
   displaying a pre-defined entry from each of the plurality of sets based on a pre-defined actuation of the input device, wherein the pre-defined actuation comprises a speed of rotation of the variable speed input device and wherein the pre-defined entry is displayed when the speed of rotation is at least equal to a threshold value; and
   displaying each of the at least one entry associated with each of the plurality of sets when the speed of rotation of the variable speed input device is less than the threshold value.

2. The method according to claim 1, wherein the pre-defined entry is selected from a group comprising a first entry associated with each of the plurality of sets, a last entry associated with each of the plurality of sets, and a most frequently accessed entry associated with each of the plurality of sets.

3. The method according to claim 1, wherein varying the speed of navigation through the data structure using the variable speed input device comprises changing the speed of rotation of the variable speed input device.

4. The method according to claim 1 further comprising rotating the variable speed input device in clockwise direction in order to scroll in a first direction in the data structure.

5. The method according to claim 1 further comprising rotating the variable speed input device in anti-clockwise direction in order to scroll in a second direction in the data structure.

6. The method according to claim 1, wherein displaying each of the at least one entry further comprises selecting the at least one entry.

7. The method according to claim 1 further comprising selecting an entry from each of the plurality of sets for display.

8. The method according to claim 1 further comprising displaying each of the at least one entry associated with each of the plurality of sets when the key is pressed for less than the threshold period.

9. The method according to claim 1, wherein the pre-defined entry is displayed at the top of a display screen.

* * * * *